(12) United States Patent
Ghera et al.

(10) Patent No.: US 7,773,884 B2
(45) Date of Patent: Aug. 10, 2010

(54) METHOD AND APPARATUS FOR AUTOMATIC SHUT-DOWN AND START-UP OF OPTICAL AMPLIFIERS IN OPTICAL NETWORKS

(75) Inventors: Uri Ghera, Tel Aviv (IL); David Menashe, Tel Aviv (IL)

(73) Assignee: Red - C Optical Newworks Ltd., Tell Aviv (IL)

( * ) Notice: Subject to any disclaimer, the term of this patent is extended or adjusted under 35 U.S.C. 154(b) by 878 days.

(21) Appl. No.: 11/538,869

(22) Filed: Oct. 5, 2006

(65) Prior Publication Data

US 2007/0098411 A1    May 3, 2007

Related U.S. Application Data

(60) Provisional application No. 60/731,237, filed on Oct. 31, 2005.

(51) Int. Cl.
*H04J 14/02* (2006.01)
*H04B 10/00* (2006.01)

(52) U.S. Cl. ............................ 398/92; 398/94; 398/160; 359/341.3

(58) Field of Classification Search ................... 398/92, 398/177, 94, 160; 359/337.12, 337.11, 337.13, 359/337.4, 341.1, 341.3, 341.33, 341.4, 341.41, 359/341.42
See application file for complete search history.

(56) References Cited

U.S. PATENT DOCUMENTS

| | | | |
|---|---|---|---|
| 5,225,922 A | 7/1993 | Charplyvy et al. | |
| 5,278,686 A | 1/1994 | Grasso et al. | |
| 5,355,250 A | 10/1994 | Grasso et al. | |
| 5,428,471 A | 6/1995 | McDermott | |
| 5,812,710 A * | 9/1998 | Sugaya | 385/27 |
| 6,049,413 A | 4/2000 | Taylor et al. | |
| 6,423,963 B1 | 7/2002 | Wu | |
| 6,452,721 B2 * | 9/2002 | Deguchi et al. | 359/341.33 |
| 6,583,899 B1 * | 6/2003 | Casanova et al. | 398/9 |
| 6,611,641 B2 | 8/2003 | Ghera et al. | |
| 6,928,243 B2 * | 8/2005 | Youn et al. | 398/33 |

* cited by examiner

*Primary Examiner*—M. R. Sedighian
(74) *Attorney, Agent, or Firm*—Mark M. Friedman (57) ABSTRACT

A method and apparatus for automatic shut-down and start-up of optical amplifiers in wavelength division multiplexed (WDM) optical networks include use of an optical channel monitor (OCM) to monitor loss and return of an input signal. By using the OCM to separately monitor the power level of each individual channel, it is possible to detect loss of all channels or return of a single channel even in the presence of ASE at the amplifier input. The OCM receives a fraction of the input power to the amplifier via an optical tap at the amplifier input, and provides an electrical output to a control unit corresponding to the optical power level of each individual WDM channel. Based on this electrical output, the control sends a shut-down or start-up signal to the pump unit within the amplifier.

17 Claims, 7 Drawing Sheets

METHOD AND APPARATUS FOR AUTOMATIC SHUT-DOWN AND START-UP OF OPTICAL AMPLIFIERS IN OPTICAL NETWORKS

CROSS REFERENCE TO RELATED APPLICATIONS

This application claims priority to U.S. Provisional Application No. 60/731,237 filed 31 Oct. 2005, which is hereby incorporated by reference in its entirety.

FIELD OF THE INVENTION

This invention relates in general to amplified optical communication systems, and more specifically to automatic shut-down and start-up mechanisms for optical amplifiers deployed in optical networks.

BACKGROUND OF THE INVENTION

High capacity optical transmission links use a Wavelength Division Multiplexed (WDM) physical layer to provide very high bandwidth (BW) on a single fiber. The WDM signals can be carried for very large distances (up to a few thousands of Kilometers) over a single fiber without the need for Optical-Electronic-Optical (OEO) regeneration.

In the past, most such transmission links were configured as simple point-to-point (P2P) links, where all WDM signals are transmitted from one end of the link to the other. Recently, however, optical links have become more complex, with part of the WDM channels being added and dropped at intermediate sites along the link using fixed or reconfigurable Optical Add/Drop Multiplexers (OADMs). The added or dropped channels may undergo electrical conversion at the intermediate sites, or they may be directly connected to another optical link without undergoing OEO regeneration, to form optical cross connects (OXCs).

In both P2P links and in more complex links with add/drop capability, optical amplifiers and other optical modules, such as Dispersion Compensation Modules (DCMs), are placed along the link in order to deliver the signal to the receiving terminal with adequate power and with minimal signal distortion. Optical amplifiers can be of many types, but most often are Erbium Doped Fiber Amplifiers (EDFAs), as described for example in U.S. Pat. Nos. 5,225,922 to Charplyvy et. al, 5,812,710 to Seguya et a., 6,049,413 to Taylor et al, and 6,611,641 to Ghera et al.

One major requirement of optical amplifiers is that they comply with various laser safety standards (such as International Standard, "Safety of Laser Products—Part 1: Equipment Classification, Requirements and User's Guide", IEC 60825-1 and International Standard, "Safety of Laser Products—Part 2: Safety of Optical Fibre Communication Systems", IEC 60825-2). These standards dictate that the optical amplifiers automatically shut-down once a disruption occurs in the fiber link (e.g. due to open connector or fiber break), thus avoiding harmful radiation being emitted from the fiber link and potential hazards to technicians and equipment. Besides automatic shut-down, it is also required that optical amplifiers automatically start-up once the disruption in the fiber link has been repaired.

Methods and apparatuses for achieving such automatic shut-down and start-up have been described for example in U.S. Pat. Nos. 5,278,686 and 5,355,250 to Grasso et al, 5,428,471 to McDermott, 6,583,899 to Casanova et al, and 6,423,963 to Wu. All refer to optical amplifiers operating within simple P2P links or closed ring links, and describe two methods for achieving automatic shut-down and start-up: (1) based on loss of input signal to the optical amplifier; (2) based on the existence of a special Optical Supervisory Channel (OSC) signal.

Figure 1:
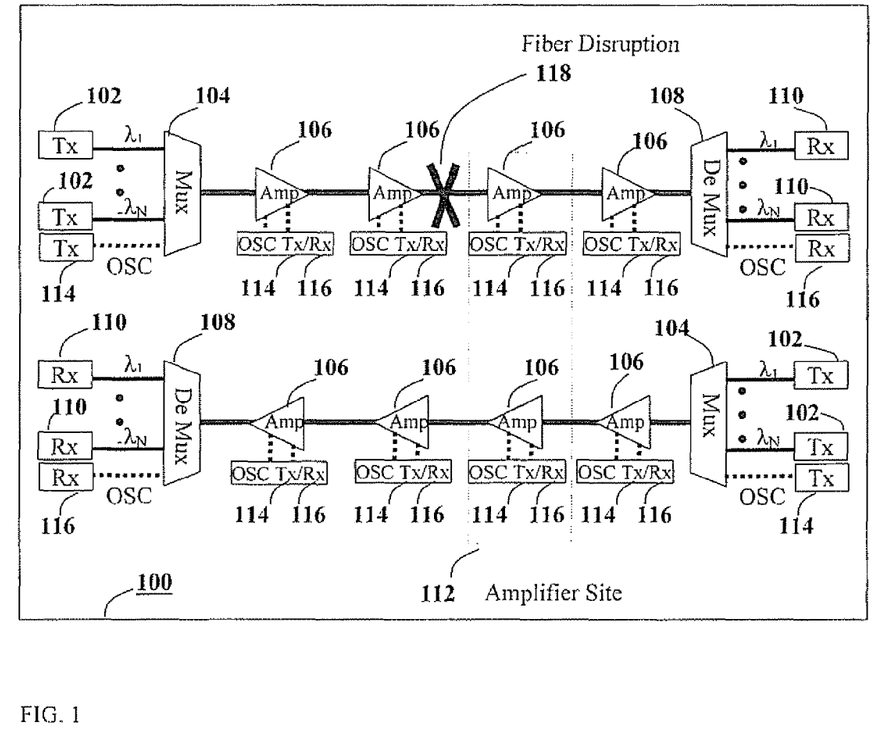
FIG. 1 illustrates prior art automatic shut-down and start-up in simple point-to-point optical transmission links.

These prior-art methods can be understood with the help of FIG. 1, which shows a simple bi-directional P2P WDM optical transmission link 100. The optical link contains a plurality of transmitters 102 for transmitting data over WDM wavelengths, multiplexers 104 to multiplex the various WDM wavelengths, optical amplifiers 106 to amplify the WDM wavelengths along the link, de-multiplexers 108 to demultiplex the WDM wavelengths, and receivers 110 for receiving the transmitted data. In a bi-directional link such as shown in FIG. 1, equipment for the two transmission directions is usually co-located at the same physical site, Thus, the transmitting terminal of one direction is co-located with the receiving terminal of the other, and vice versa. Additionally, amplifiers for opposite directions are co-located at the same amplifier site 112, as shown in the figure. The link may also include OSC transmitters 114 and receivers 116, placed at the terminals and at the amplifier sites, used for transmitting and receiving an OSC signal which serves to provide management and supervisory instructions to the various sites along the link. Furthermore, the OSC may be modulated using an AC tone, in addition to the data modulation, thus facilitating the detection of its presence or absence along the link.

In a method for automatic shut-down and start-up based on loss of input power, a fiber disruption 118 occurring along the link means that the amplifier immediately following the disruption (in the downstream direction) will not receive any input power. Since optical amplifiers typically incorporate an optical tap and detector at the input to the amplifier, the loss of input power can be easily detected, and the amplifier can automatically shut itself down. This will cause the next amplifier in the link to lose input power and shut down, and so on down the link until the receivers themselves detect the loss of input power. This will then cause the transmitters in the opposite direction (co-located at the same site as the receivers) to shut down, followed by shut-down of all amplifiers in the opposite direction, followed by loss of input to the receivers in the opposite direction, followed by shut-down of transmitters in the original direction, followed by shut-down of all amplifier preceding (upstream of) the original fiber disruption. Thus, this chain of events leads to the shut-down of the entire bi-directional link. Alternatively, since amplifiers in opposite directions may be co-located at the same amplifier site 112, loss of input to one amplifier may cause immediate shut-down of the amplifier in the opposite direction, thus speeding up the whole shut-down process. Automatic start-up of the link occurs when the fiber disruption is repaired and when each amplifier along the link consecutively detects input power and automatically powers up.

In a method for automatic shut-down and start-up based on OSC, a similar process as above occurs, except that instead of detecting the input power within the transmission band, the presence or absence of the OSC (which is typically located outside the transmission band) is detected. This is particularly useful when the optical amplifier includes a distributed Raman pre-amplifier working in a backwards pumping configuration (see e.g. U.S. Pat. No. 6,423,963). In such a case, Amplified Spontaneous Emission (ASE) noise may exist within the signal band even after a fiber disruption occurs, thus preventing the amplifier from identifying the loss of input power. However, the fiber disruption causes the OSC to disappear, and this is easily detected either using the OSC AC tone described above, or by directly monitoring the data modulation of the OSC. Automatic start-up occurs when the fiber disruption has been repaired, and the presence of the OSC is detected.

While automatic start-up and shut-down based on OSC is a powerful method, not all systems support an OSC, and those that do typically use proprietary modulation methods and/or AC tones. This means that an amplifier relying on an OSC for start-up and shut-down must be tightly integrated into the host system, which in turn must support an OSC.

Figure 2:
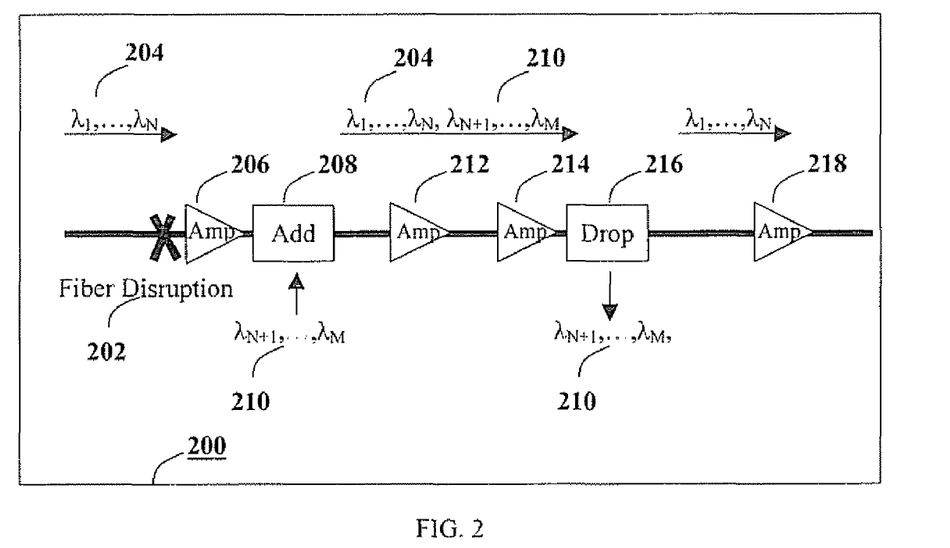
FIG. 2 illustrates a section of a link including Add/Drop capabilities, and illustrates why prior all automatic shut-down and start-up methods fail in such a link.

Furthermore, both above mentioned methods were designed to work in simple P2P optical links, but they do not function properly in more complex optical link, in which part of the WDM channels are added and dropped at intermediate sites. This is illustrated in FIG. 2, which shows a portion 200 of such a link. In the example shown in the figure, wavelengths 210 are added to the link at one site 208, and dropped from the link at a next site 216. The Added/Dropped wavelengths may undergo OEO conversion, or may be directly transferred to/from other optical links via OXCs. For the sake of clarity, the figure shows only a section of the link, without terminal equipment (transmitters and receivers), and only one transmission direction.

Consider now a fiber disruption 202 as shown in FIG. 2. Due to this disruption an amplifier 206 will experience a loss of input power, and therefore shut-down. Thus, the first group of wavelengths $\lambda_1, \ldots, \lambda_N$ 204 will not reach an Add unit 208. However, a second group of wavelengths $\lambda_{N+1}, \ldots, \lambda_M$ 210 is added to the link at Add unit 208 and continues down the link. Thus, amplifiers 212 and 214 will not experience a loss of input power, and will not shut down (indeed they should not shut down, since they need to keep working in order to carry the remaining traffic). Moreover, since amplifiers 212 and 214 continue working, they generate ASE noise within the entire transmission band, including that part of the band occupied by $\lambda_1, \ldots, \lambda_N$, even though these wavelengths themselves are not present. The group of wavelengths $\lambda_{N+1}, \ldots, \lambda_M$ 210 is dropped at a Drop unit 216, and therefore does not reach an amplifier 218. Thus, amplifier 218 does not receive any wavelength at all, since the original wavelength group $\lambda_1, \ldots, \lambda_N$ 206 is not present due to the disruption 202. However amplifier 218 does receive ASE noise within the wavelength band occupied by $\lambda_1, \ldots, \lambda_N$, generated by amplifiers 212 and 214, and thus may not be able to detect the loss of input power condition. Thus, amplifier 218 will not shut-down as required, disrupting the chain reaction previously described in the context of FIG. 1 for shutting down a fiber link.

Regarding the OSC method of shut-down and start-up, due to disruption 202 the OSC does not reach amplifier 206. However, since the section of the link between Add unit 208 and Drop unit 216 continues to work, the OSC is regenerated in this part of the link and needs to be transmitted along the remaining part (following Drop unit 216) in order to pass information to system management at the end of the link. Thus, the OSC will be detected at amplifier 218, and cannot be used to determine shut-down of this amplifier.

Thus, there is a need for automatic shut-down and start-up methods and systems within or combined with optical amplifiers that function correctly in optical links including OADMs.

SUMMARY OF THE INVENTION

The present invention relates to the use of an Optical Channel Monitor (OCM) to determine loss of input signal to an amplifier, and thus perform automatic shut-down and start-up of the amplifiers. The use of an OCM overcomes the basic problem of the prior art methods, which are based on the detection of the total optical power within the transmission band, including signals and ASE. In optical links containing OADMs, ASE can exist in sections of the links even when signals do not exist, and the magnitude of the ASE can be quite large compared to the expected signal power. Thus, the total optical power in the transmission band cannot be used to determine loss of signal.

On the other hand, an OCM separately monitors the power level of each individual channel, so that for each channel only a small portion of the ASE (that lies within the channel bandwidth) is included in the monitored power level. In order for a communication system to operate correctly, the ratio between the signal and ASE within each individual channel, also known as the Optical Signal to Noise Ratio (OSNR), must be large (e.g. above 20 dB for a 10 Gb/s channel). Thus the ASE noise can always be considered to be much smaller than the signal power for an individual channel, and the loss of signal condition can be correctly determined.

In the present invention, a shut-down signal is sent to the pump unit within the amplifier when the control unit determines that the power level of all channels within a pre-defined set of WDM channels has decreased below a certain threshold. Conversely a start-up signal is sent to the pump unit when the control unit determines that the power level of at least one channel within the set rises above the threshold.

According to the present invention there is provided an optical amplifier operative to monitor loss and return of an input signal in a WDM optical network carrying a plurality of WDM channels, the amplifier including: a gain stage; a pump unit for supplying pump power to the gain stage; a first optical tap connected to an input to the amplifier; an optical channel monitor (OCM) coupled to the first optical tap and used for monitoring an optical power level of each WDM channel and for providing a respective electrical output; and a control unit for determining, based on the respective electrical output, an action affecting the pump unit.

According to the present invention there is provided a WDM optical network operative to monitor loss or return of input signal at the optical amplifiers within the network, the network including: a transmitting terminal for transmitting a plurality of WDM channels; a receiving terminal for receiving a plurality of WDM channels, an optical amplifier having an input; a gain stage and a respective pump unit for supplying pump power to the gain stage; an OCM operative to tap the input of the amplifier in order to monitor the optical power level of each WDM channel and, based on the tapped optical power levels, to provide a respective electrical output; and a control unit for determining, based on the respective electrical output, an action affecting the optical amplifier.

According to the present invention there is provided a method for automatic shut-down and start-up of optical amplifiers in a WDM optical network carrying a plurality of WDM channels, the method comprising steps of providing an optical amplifier having an input, a gain stage and a respective pump unit for supplying pump power to the at least one gain stage; using an OCM to tap the optical power of each WDM channel at the amplifier input and, based on the tapped optical power, to provide a respective electrical output; and, based on the respective electrical output, performing an action affecting the respective pump unit.

DESCRIPTION OF THE PREFERRED EMBODIMENTS

The principles and operation of the apparatus of the present invention may be better understood with reference to the drawings and the accompanying description.

Figure 3:
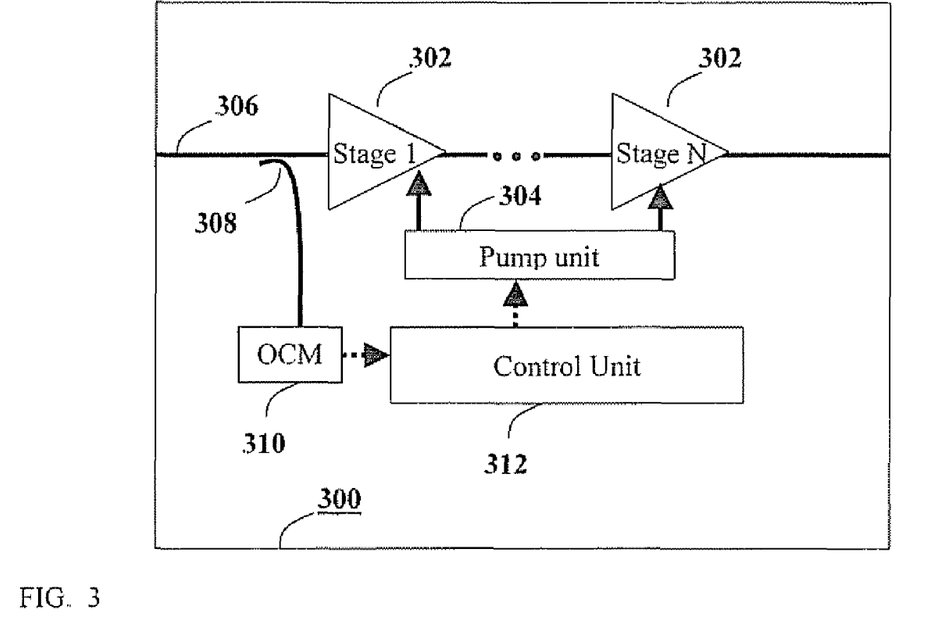
FIG. 3 shows an optical amplifier operative to detect loss of input signal using an OCM according to the present invention.

Referring now to the drawings, FIG. 3 shows an optical amplifier 300 according to one embodiment of the present invention. The amplifier may include one or more (1 . . . N) amplification stages 302, with each stage further including at least one amplification medium (e.g. Erbium Doped Fiber). The gain stages may be all of the same type, or of different types. For example, all gain stages may be EDFAs, or some may be EDFAs and some may be Raman amplifiers. Each stage may optionally include other components such as pump signal multiplexers, optical taps, optical detectors, Gain Equalization Filters (GEFs), and Variable Optical Attenuators (VOAs) (not shown). Amplifier 300 further includes a pump unit 304 for pumping energy into the amplification media of the various stages. For example, for an EDFA, such a pump unit would typically include 980 nm or 1480 nm laser diodes. Pump unit 304 may include separate pumps for each amplification stage, or pumps which are used to pump energy into more than one stage. In addition, some amplification stages may not be pumped at all. Amplifier 300 further includes an input 306 before a first amplification stage (Stage 1), on which an optical tap 308 is placed to tap a small percentage of the input optical power (typically 1-5%). This power percentage is directed to an OCM 310. The electrical output of the OCM is connected to a control unit 312 operative to detect loss or resumption of input signal, and respectively cause automatic shut-down or start-up of the amplifier. Control unit 312 includes the hardware and logic required to determine a loss of input signal condition using the data output by OCM 310. Upon determination of such a condition, control unit 312 provides a signal to pump unit 304 to shut down all pumps. Control unit 312 further includes hardware and logic to determine a resumption of input signal using the input of OCM 310, upon which a signal is sent to the pump unit to restart the pumps.

OCM 310 is operative to separately detect the optical power level within each of the WDM signal channels contained within the operating wavelength band of the optical amplifier. Such OCMs are well known, and can be realized, for example, using a tunable optical filter coupled to a detector, or a grating structure coupled to an array of detectors. The set of power readings for all the WDM signal channels form the electrical data output of OCM 310, which is fed to control unit 312. Each WDM signal channel is typically defined as a small wavelength range centered on standard central wavelengths. Such a set of standard central wavelengths, as well as the wavelength range of each channel are defined for example in the so called ITU-T grid (International Telecommunication Union standard ITU-T G.694.1 "Spectral grids for WDM applications: DWDM frequency grid" and International Telecommunication Union standard ITU-T G.694.2 "Spectral grids for WDM applications: CWDM wavelength grid").

Since OCM 310 monitors separately the power level of each individual channel, the ASE problem noted above does not exist. The reason for this is that in order for the communication system to operate correctly, the ratio between the signal and ASE within each individual channel, (the OSNR), must be large (e.g. around 20 dB for a 10 Gb/s channel). Thus, ASE noise can always be assumed to be below a specific threshold, such that if the detected power level of the channel is below this threshold, it can be safely assumed that no signal exists and that only ASE exists. Consequently, the OCM can detect a loss of signal in a given channel even in the presence of ASE. Conversely, if the detected power level is above the threshold, it can safely be assumed that the signal exists (over and above the ASE), so that the OCM can detect a resumption of signal even in the presence of ASE. In practice, the threshold for detection of the resumption of signal is often somewhat higher than the threshold for loss of signal (so called hysteresis), thus avoiding frequent shut-down and start-up operations when the power levels are very close to the threshold.

Figure 4:
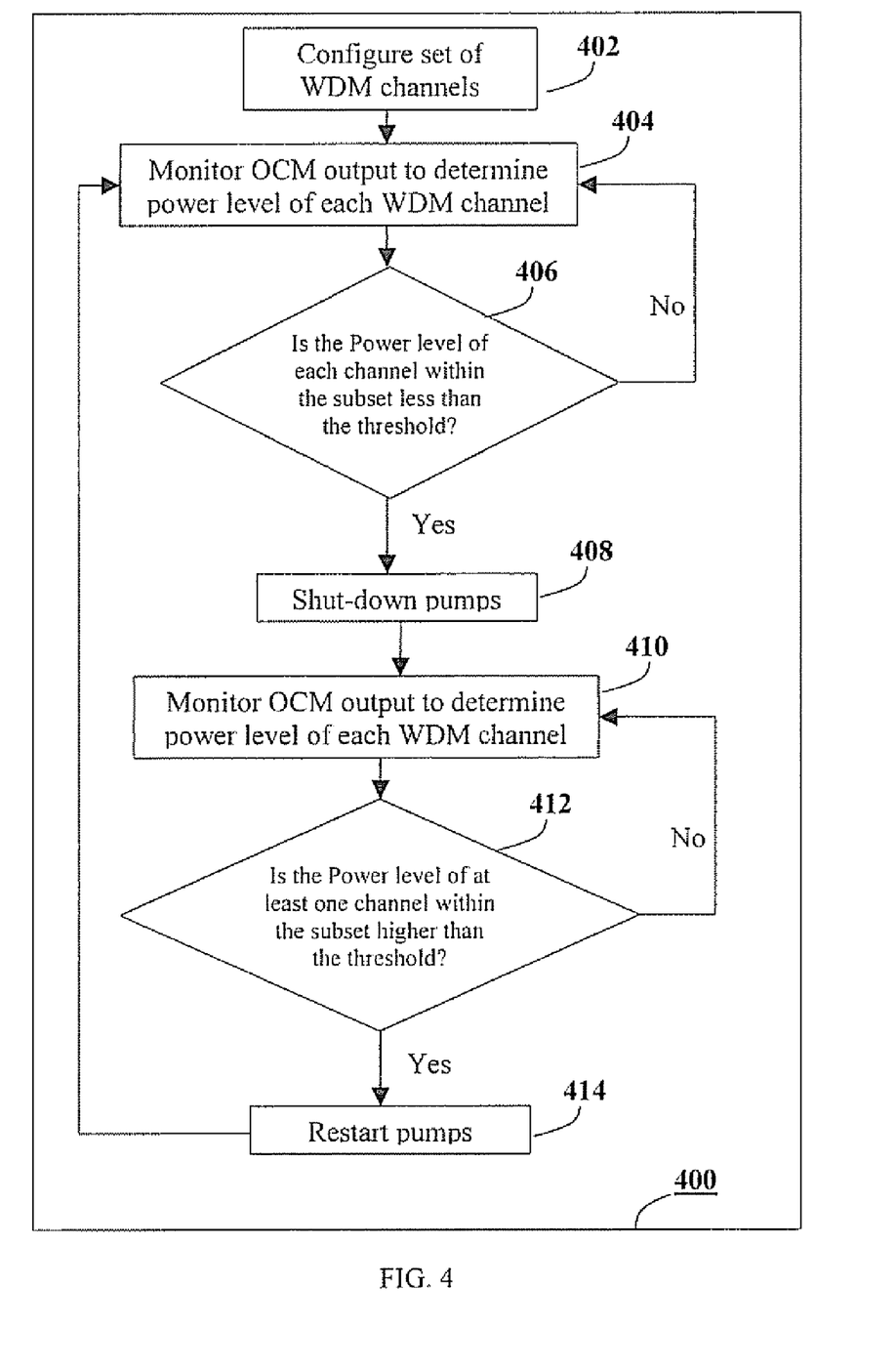
FIG. 4 shows a flowchart for the operation of the control unit of the optical amplifier of FIG. 3.

The operation of control unit 312 is shown by a flowchart 400 in FIG. 4, and is now described in detail. The control unit is operative to monitor the OCM signal to determine whether each of the power levels of a pre-determined set of WDM channels are below certain corresponding pre-determined thresholds. This set of WDM channels is configured in step 402, which may be performed upon installation of the amplifier (e.g. by a technician), or may be continuously updated via the management system of the network, which is typically able to communicate with all amplifiers deployed in the network. In step 404, the control unit monitors the OCM output, to determine the power level of each WDM channels. A check 406 is then performed to determine if the power levels of each of the WDM channels in the pre-defined set are below their respective thresholds. If such a condition is not detected, the control unit returns to step 404 to read a new OCM output. If such a condition is detected, then step 408 is executed whereby control unit 312 sends a shut-down signal to pump unit 304. In step 410, the control unit proceeds to monitor a new OCM output, an action performed while the amplifier is in shut-down status. A check 412 is then performed to determine whether at least one of the power levels of the WDM channels within the set rises above its corresponding threshold. If such a condition is not detected, then the control unit returns to step 410 to read a new OCM output. If such a condition is detected, then step 414 is executed, whereby control unit 312 sends a restart signal to pump unit 304 to restart the amplifier. Following this, the control unit returns to step 404 to monitor the new OCM output.

In the simplest case, the set of WDM channels referred to in step 402 includes all channels within the C-Band, and the pre-determined threshold is common to all channels. Thus, if the power within all C band channels is less than the threshold, a loss of input signal condition exists, and the amplifier will shut down. Conversely, if the power within one of the channels rises above the threshold, then the loss of input signal ceases to exist, and the amplifier will restart.

In another case, the threshold used to determine the startup condition in step 412 may be different (typically larger) than the threshold used to determine the shutdown condition in step 412. This may provide more stable operation, avoiding frequent shut-down and start-up operations when the power levels are very close to the threshold.

In yet another case, the set of WDM channels referred to in step 402 may be defined as only those channels relevant to the amplifier in question, so that the OCM need only monitor these channels (and thus perform more efficiently). For example, referring to FIG. 2, the set of WDM channels for amplifier 218 may be defined as $\lambda_1, \ldots, \lambda_N$, since only these channels are designated to reach the amplifier.

In yet another case, different thresholds may be defined for different channels. For example, referring again to FIG. 2, it may be that channels $\lambda_1$ and $\lambda_2$ originate from one part of the link, whereas channels $\lambda_3, \ldots, \lambda_N$ originate from another. Thus the two sub-sets of channels may have different power levels and different OSNR levels, which means that different thresholds are required in order to determine a loss of signal for a given channel belonging to a respective subset.

Figure 5:
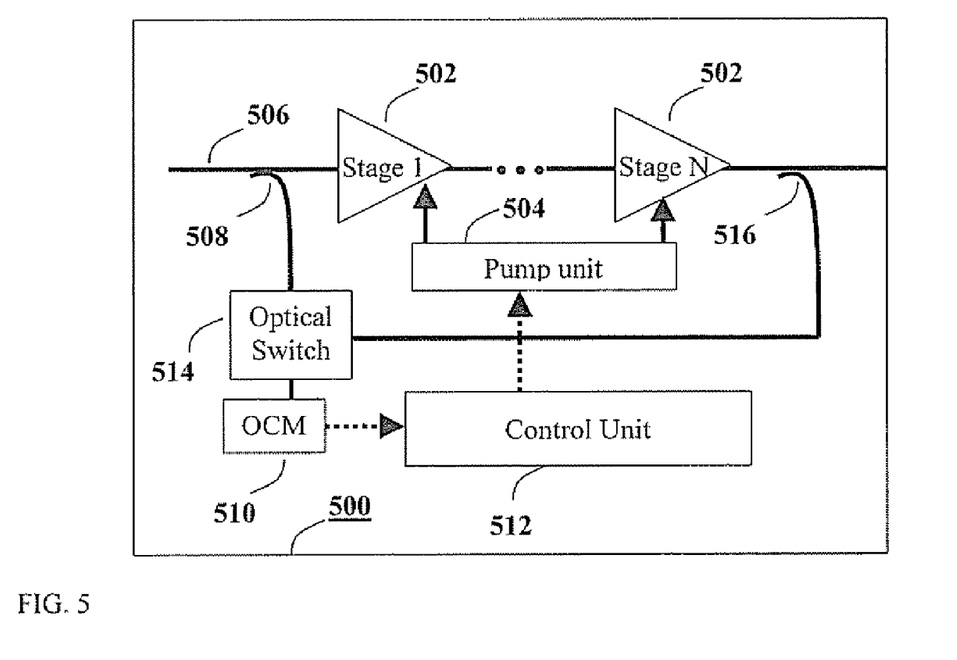
FIG. 5 shows an optical amplifier according to another embodiment of the present invention.

FIG. 5 shows an optical amplifier 500 according to another embodiment of the present invention. Elements 502 to 512 are analogous to elements 302 to 312 of FIG. 3 and function as previously described, with the exception that an optical switch 514 is now placed before an OCM 510, and an additional optical tap 516 is placed at the output of the amplifier. Another optical tap 508 and optical tap 516 are both connected to the input ports of optical switch 514, whose output port is connected to OCM 510. Thus, optical switch 514 functions to select which signal (of two), from tap 508 or tap 516, is analyzed by the OCM. In a typical application, switch 514 will alternately switch between the two signals, so that the OCM can alternately monitor the input and output ports of the amplifiers. The advantage of such a configuration is that a single OCM can be used for different purposes, thus leading to cost and space savings. In the current example, the OCM monitors the input of the amplifier to determine a loss of input signal condition, and thus automatic shut-down and start-up as previously described, but can also monitor the output of the amplifier to control the amplifier performance. For example, the OCM may be used to monitor the output power of each channel, so that the gain and tilt of the amplifier may be set to achieve a desired output power per channel.

In a similar manner, additional optical taps may be placed at different parts of the amplifier, and connected via a multi-port switch to the OCM. Thus, the OCM may perform different function within the amplifier, in addition to determining the loss of input signal condition for automatic start-up and shut-down.

Figure 6:
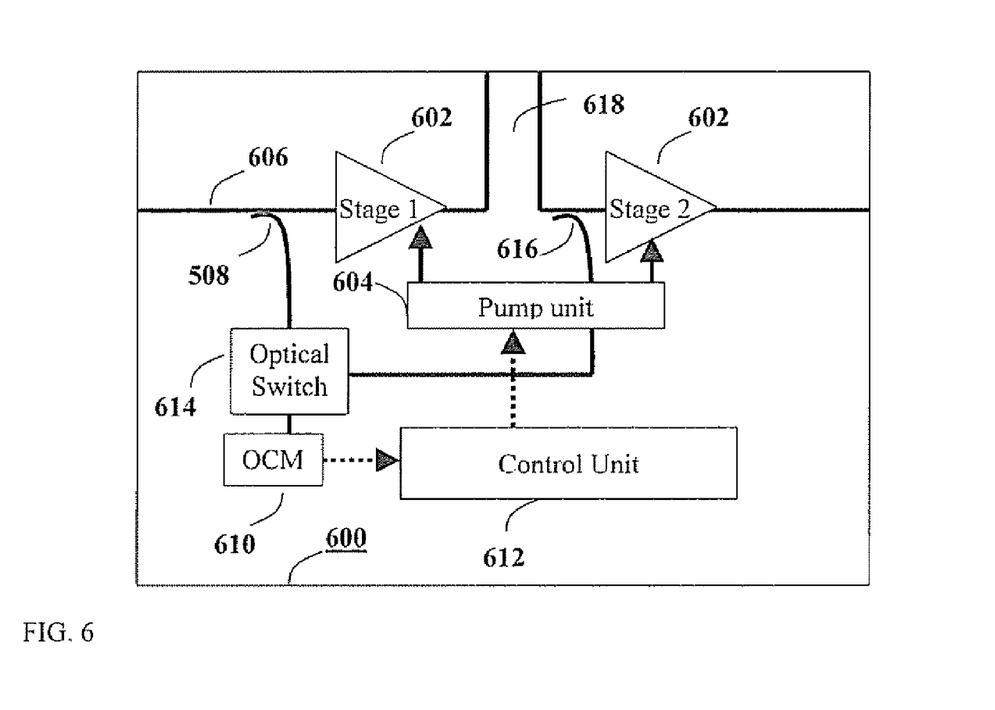
FIG. 6 shows an optical amplifier according to yet another embodiment of the present invention.

FIG. 6 shows an optical amplifier 600 according to another embodiment of the present invention. Elements 602 to 616 are analogous to elements 502 to 516 of FIG. 5 and function as previously described, with the exception that a mid-stage access 618 is now provided between the amplifier stages, and allows other optical modules such as OADMs and Dispersion Compensation Modules to be connected to the amplifier. In this example optical tap 616 is placed at the input to the second amplifier stage, which allows OCM 610 to also monitor whether a loss of input signal condition has occurred at the input to the second amplifier stage (i.e. at the output of the mid stage). Thus, using switch 614, the OCM can monitor the input of each of the two amplification stages, and determine a loss of input condition, as previously described, for both stages separately. For example, if a loss of input condition is detected only at the input of the second stage, and not at the input to the first stage, then control unit 612 may determine only to shut-down the second stage of the amplifier.

In a similar manner, additional amplifier stages may be added and additional mid stage access may be provided between these stages. Then, using a multiple port switch, the OCM may be configured to monitor the input to one or more of the amplification stages, to determine the loss of input condition for each of the monitored stages separately.

Figure 7:
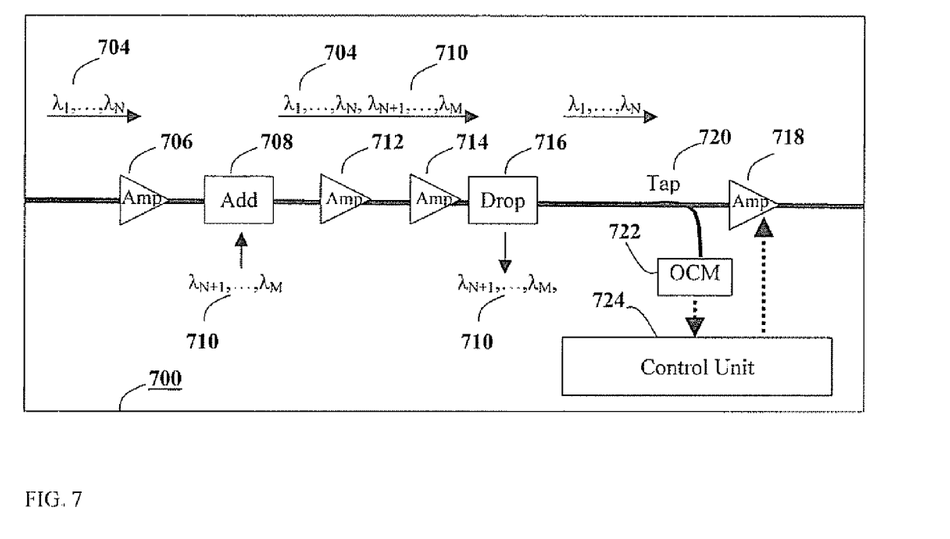
FIG. 7 shows an optical link operative to detect loss of input signal to an amplifier using an OCM according to another embodiment of the present invention.

FIG. 7 shows a portion 700 of an optical communication system according to another embodiment of the present invention. For clarity, the transmitters and receivers of the system are not shown, and only a single transmission direction is shown. Elements 704 to 718 are analogous to element 204 to 218 of FIG. 2, with the exception that an optical tap 720 is placed before the input to amplifier 718, and directs a portion of the optical power to an OCM 722. OCM 722 is connected to a control unit 724 that can send a shut-down or start-up signal to amplifier 718. The operation of the control unit is according to the flowchart shown in FIG. 4.

In a similar manner other optical taps, OCMs and control units may be placed before other amplifiers within the system to control their automatic shut-down and start-up according to loss of input signal.

All patents and publications mentioned in this specification are herein incorporated in their entirety by reference into the specification, to the same extent as if each individual patent and publication was specifically and individually indicated to be incorporated herein by reference.

While the invention has been described with respect to a limited number of embodiments, it will be appreciated that many variations, modifications and other applications of the invention may be made.

What is claimed is:

1. An optical amplifier operative to monitor loss and return of an input signal in a wavelength division multiplexed (WDM) optical network carrying a plurality of WDM channels, comprising:
   a. a gain stage;
   b. a pump unit for supplying pump power to the gain stage;
   c. a first optical tap connected to an input to the amplifier;
   d. an optical channel monitor (OCM) coupled to the first optical tap and used for monitoring an optical power level of each WDM channel and for providing a respective electrical output; and
   e. a control unit for determining, based on the respective electrical output, an action affecting the pump unit;
   wherein the action is selected from the group consisting of a shut-down of the pump unit when the optical power level of each WDM channel is below a corresponding pre-defined first threshold, and start-up of the pump unit when the optical power level of at least one WDM channel is above a corresponding pre-defined second threshold.

2. The amplifier of claim 1, wherein the first threshold is the same for all WDM channels, and wherein the second threshold is the same for all WDM channels.

3. The amplifier of claim 1, wherein each of the first and second thresholds is different for different WDM channels.

4. The amplifier of claim 1, wherein each gain stage includes an Erbium doped fiber.

5. The amplifier of claim 1, wherein the OCM is operative to monitor the power levels of only a sub-set of WDM channels designated to pass through the amplifier, chosen from all the WDM channels in the system.

6. The amplifier of claim 1, further comprising a second optical tap and an optical switch configured such that the OCM can perform additional functions by monitoring other parts of the amplifier.

7. The amplifier of claim 1 wherein the amplifier further comprises at least one additional gain stage and a mid-stage access between two consecutive gain stages to allow for additional devices to be connected to the amplifier.

8. The amplifier of claim 7, further comprising a tap at the input of each gain stage, each said tap operatively connected to an optical switch configured to allow the OCM to monitor the inputs of more than one amplifier gain stage, thus providing the control unit with the necessary electrical output to separately determine loss or return of input signal for each gain stage.

9. A wavelength division multiplexed (WDM) optical network operative to monitor loss or return of input signal at the input of optical amplifiers within the network, comprising:
   a. a transmitting terminal for transmitting a plurality of WDM channels;
   b. a receiving terminal for receiving a plurality of WDM channels;
   c. an optical amplifier having an input, a gain stage and a respective pump unit for supplying pump power to the gain stage;
   d. an optical channel monitor (OCM) operative to tap the input of the amplifier, in order to monitor the optical power level of each WDM channel and, based on the tapped optical power levels, to provide a respective electrical output; and
   e. a control unit for determining, based on the respective electrical output, an action affecting the optical amplifier;
wherein the action is selected from the group consist of a shut-down of the amplifier when the optical power level of each WDM channel is below a corresponding pre-defined first threshold, and start-up of the amplifier when the optical power level of at least one WDM channel is above a corresponding pre-defined second threshold.

10. The optical network of claim 9, wherein the first threshold is the same for all WDM channels, and wherein the second threshold is the same for all WDM channels.

11. The optical network of claim 9, wherein each of the first and second thresholds is different for different WDM channels.

12. The optical network of claim 9, wherein the amplifier is an Erbium Doped Fiber Amplifier.

13. The optical network of claim 9, wherein the OCM is operative to monitor the power levels of only a sub-set of WDM channels designated to pass through the amplifier, chosen from all the WDM channels in the system.

14. A method for automatic shut-down and start-up of optical amplifiers in a wavelength division multiplexed (WDM) optical network carrying a plurality of WDM channels, the method comprising steps of:
   a. providing an optical amplifier having an input, a gain stage and a respective pump unit for supplying pump power to the gain stage;
   b. using an optical channel monitor (OCM) to tap the optical power of each WDM channel at the amplifier input and, based on the tapped optical power, to provide a respective electrical output; and
   c. based on the respective electrical output, performing an action affecting the respective pump unit;
wherein the step of performing an action includes performing an action selected from the group consisting of a shut-down of the pump unit when the optical power level of each WDM channel is below a corresponding pre-defined first threshold, and start-up of the pump unit when the optical power level of at least one WDM channel is above a corresponding pre-defined second threshold.

15. The method of claim 14, wherein the first threshold is the same for all WDM channels, and wherein the second threshold is the same for all WDM channels.

16. The method of claim 14, wherein each of the first and second thresholds is different for different WDM channels.

17. The method of claim 14, wherein the gain stage includes an Erbium doped fiber.

* * * * *

UNITED STATES PATENT AND TRADEMARK OFFICE
CERTIFICATE OF CORRECTION

PATENT NO. : 7,773,884 B2
APPLICATION NO. : 11/538869
DATED : August 10, 2010
INVENTOR(S) : Uri Ghera and David Menashe It is certified that error appears in the above-identified patent and that said Letters Patent is hereby corrected as shown below:

On the title page, item:

Assignee (73)
Change:
-- Newworks --
to
"Networks"

Assignee's address (73)
Change:
-- Tell --
to
"Tel"

Column 9

Claim 9, line 26
change
-- consist --
to
"consisting"

Signed and Sealed this

Thirtieth Day of November, 2010

David J. Kappos
*Director of the United States Patent and Trademark Office*